3 Sheets—Sheet 1.

J. E. J. GOODLETT.

BARREL FILLING APPARATUS.

No. 11,600. Reissued May 4, 1897.

WITNESSES:

Jos. A. Ryan

Amos W. Hart

INVENTOR

Joseph E. J. Goodlett.

BY Munn & Co.

ATTORNEYS.

3 Sheets—Sheet 2.

J. E. J. GOODLETT.

BARREL FILLING APPARATUS.

No. 11,600.

Reissued May 4, 1897.

WITNESSES:

Jos. A. Ryan

Amos W. Hart

INVENTOR

Joseph E. J. Goodlett.

BY Munn & Co.

ATTORNEYS.

J. E. J. GOODLETT.
BARREL FILLING APPARATUS.
No. 11,600. Reissued May 4, 1897.
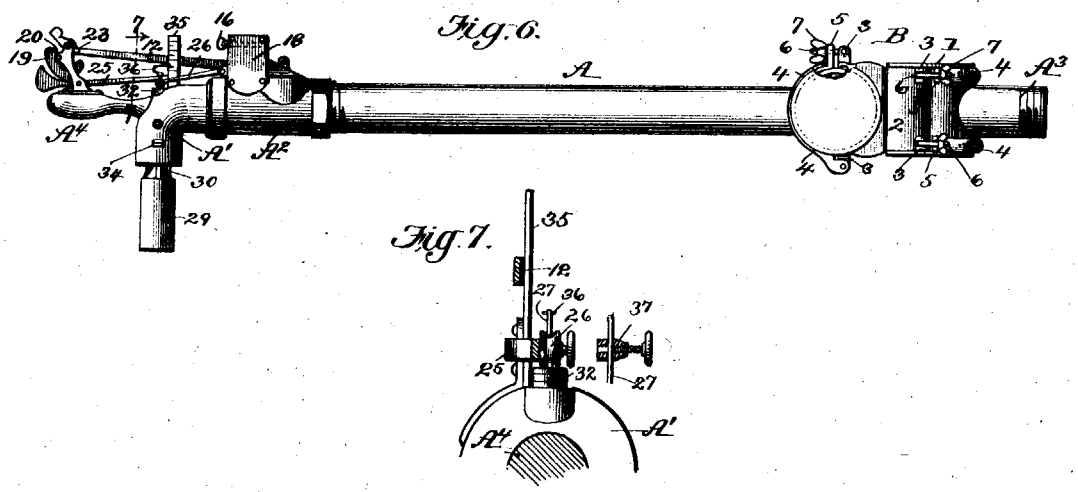
WITNESSES:
Jos. A. Ryan
Amos W. Hart
INVENTOR
Joseph E. J. Goodlett.
BY Munn & Co.
ATTORNEYS.

UNITED STATES PATENT OFFICE.

JOSEPH E. J. GOODLETT, OF MEMPHIS, TENNESSEE.

BARREL-FILLING APPARATUS.

SPECIFICATION forming part of Reissued Letters Patent No. 11,600, dated May 4, 1897.

Original No. 570,851, dated November 3, 1896. Application for reissue filed March 6, 1897. Serial No. 626,343.

*To all whom it may concern:*

Be it known that I, JOSEPH ECCLESTON JOHNSTON GOODLETT, of Memphis, in the county of Shelby and State of Tennessee, have invented a new and useful Improvement in Barrel-Filling Apparatus, of which the following is a specification.

My invention is an improvement in that class of fillers for liquid-receptacles which are provided with a valve attachment for automatically cutting off the flow of liquid when a receptacle is filled to the required limit.

The construction and operation of the apparatus are as hereinafter described, reference being had to accompanying drawings, (three sheets,) in which—

Figure 1:
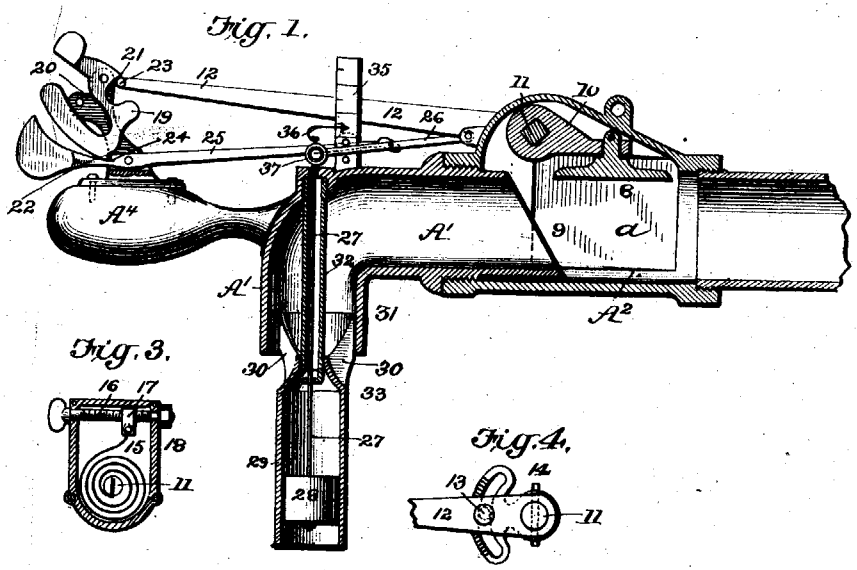
Figure 2:
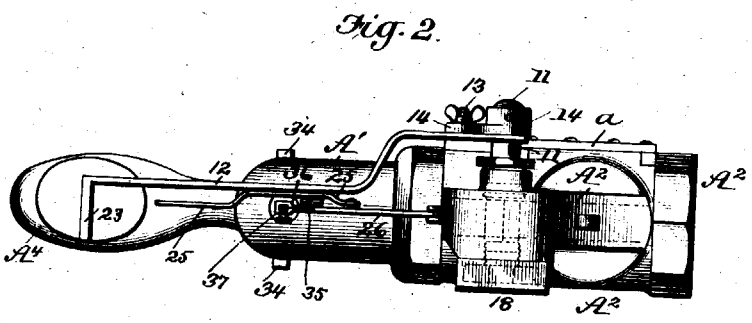
Figure 5:
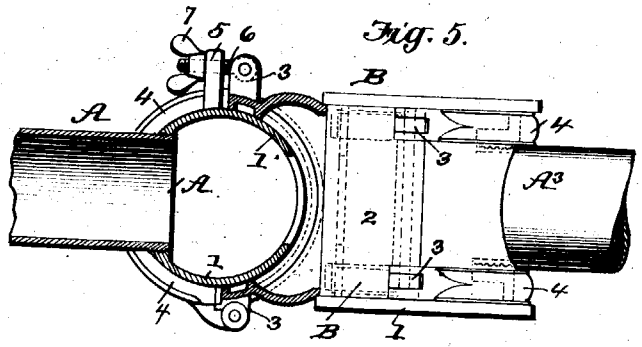

Figure 1 is a central longitudinal section of the main portion of my improved apparatus or instrument, omitting the trigger for the trip-levers. Fig. 2 is a plan view of the same, omitting the trigger for the valve-lever. Fig. 3 is a detail section of a portion of the apparatus. Fig. 4 is a detail side view of a portion of the apparatus. Fig. 5 is in part a section and in part a side view of the main portion of the apparatus. Fig. 6 is a side view of the complete apparatus. Fig. 7 is a cross-section on line 7 7 of Fig. 6.

The tubular body of the apparatus or instrument consists (see Fig. 6) of a tube A, a gooseneck A′, a valve-chamber $A^2$, which connects the parts A A′, also an extension $A^3$, which is fixedly coupled to A by a universal joint B. The extension $A^3$ is screw-threaded to adapt it to be screwed into a tank (not shown) from which the supply of liquid is to be drawn. The universal coupling B enables the gooseneck or discharge end A′ of the instrument to be directed in any direction vertically or laterally. It is formed mainly of four parts—namely, two cylinders or cylindrical tubes 1, Figs. 5 and 6, each having opposite openings at opposite sides, and an intermediate tubular section 2 of irregular form. The said cylinders are arranged at right angles to each other, and the tube A is screwed into one of them and the extension $A^3$ into the other.

The body-section 2 is provided at each end, on opposite sides thereof, with two lateral parallel ears 3, which are perforated transversely. To one pair of such ears, at each end of the section 2, are pivoted semicircular clamping-arms 4, whose radial free ends 5 are provided with notches to receive screws 6, which are pivoted to the ears on the opposite side of the section 2. In putting the parts of the coupling in place the semicircular arms 4 pass around the cylinders 1 1 on each side of the tube A and extension $A^3$, as shown, and the screws 6 drop into the notches in their free ends 5 and are secured by wing-nuts 7, so that the parts are clamped firmly together to form a water-tight joint that will nevertheless allow the tube A and its attached gooseneck or nozzle A′ to be turned or deflected at any angle desired.

The valve-chamber $A^2$ for connecting parts A and A′ has an enlargement on the upper side, Fig. 1, which serves as a chamber for the valve 8 when the latter is thrown back from its seat 9, as shown. The seat is formed by the end of the gooseneck which projects into the chamber $A^2$, the seat having an angle or inclination of about forty-five degrees. Said chamber $A^2$ has an opening on one side, Figs. 1 and 2, which is closed, Fig. 2, by detachable plate *a*, held to place by screws, as shown. The opening enables the valve 8 to be readily examined or another substituted when required, and also permits convenient removal of any sediment or other foreign matter that may lodge in the chamber.

The valve 8 is attached to an arm 10, fixed radially on a rotatable shaft 11, which passes through and is journaled in the enlarged portion of the chamber A′. A long arm or lever 12 is applied, Fig. 2, to one of the projecting ends of this shaft 11 and secured by a clamp-screw 13 to a short slotted sector 14, Fig. 4, which is keyed on the shaft 11 beside the lever 12.

It is apparent that the lever 12, being mounted loose on the shaft 11, may be adjusted around the latter to vary its angle to the valve 8 and held or clamped in any adjustment to slotted sector 14. The outer end of the latter is roughened or toothed on the inner side to increase friction between it and the lever. The short stem of valve 8 fits loosely in the hole in arm 10, so that it may more readily and perfectly adjust itself to its seat.

To the end of the valve-shaft 11 opposite that carrying the lever 12 is affixed a coiled plate-spring 15, Fig. 3, whose function is to hold the valve normally closed. The tension of this spring is regulated by a rotatable screw-rod 16 and a nut 17, which works on the latter, one end of such spring 15 being attached to the nut and the other to the valve-shaft 11, as shown.

The spring 15 and its tension-regulating device are inclosed in a vertical chambered extension 18 of the valve-chamber $A^2$, Figs. 3 and 6, save that the winged or flattened end of the screw-rod is accessible on the outer side.

The mechanism for tripping the lever 12 is constructed as follows: A trigger or trip-catch 19 of irregular form, Figs. 1 and 6, is pivoted and thus adapted to swing vertically on a bracket 20, fixed on the handle $A^4$. This trigger 19 is weighted by extensions on its outer side and provided on its inner side with two angular shoulders 21 and 22. The upper shoulder 21 engages the lateral projection 23 on the free end of the lever 12, and the lower one, 22, engages a corresponding shoulder 24 of a trip-lever 25, which is pivoted to the bracket 20 beneath the trigger 19. The outer end of this lever 25 is weighted, and its inner end is pivoted to another shorter lever 26, which is pivoted at one end to the body of the instrument and at the other end to the rod 27, which carries the float 28. Thus the two parts 25 and 26 are arranged side by side and constitute in effect a compound lever. The aforesaid float 28 slides in a tube 29, which is pendent from and alined with the gooseneck A′. It is supported by the small vertical tube 32, which is arranged in the gooseneck and screwed into a socket in a boss of the upper portion of the gooseneck. The float-tube 29 is screwed on the lower end of said tube 32 and provided with oblique arms that fit loosely in the lower end of tube 29 and serve to brace it rigidly in position. The tube 29 is separated from the gooseneck A′ to allow due space for passage of liquid, and it is made much smaller than the gooseneck to enable the current of liquid to pass obliquely downward, so that it may enter the cask without spattering outside, as it would tend to do if the tube 29 were of same size as the gooseneck, since it would then be diverted laterally at a right angle, or nearly so.

The float-rod 27 is provided and guided by the tube 32, whose lower end enters the upper end of the float-holder 29, and is provided at its lower end with an inwardly-curved finger or lug 33, which is perforated to serve as a guide for the rod 27.

The valve mechanism operates as follows: The float-holder and gooseneck being inserted up to the lateral ears 34, Figs. 2 and 6, in the bung-hole of a barrel or other cask to be filled, the lever 12 is drawn down and locked with the shoulder 21 of the trigger 19, as shown in Fig. 1, the valve 8 being thereby opened. The trigger 19 is prevented from tilting and releasing the lever 12 by reason of the engagement of its lower shoulder 22 with shoulder of float trip-lever 25. When the liquid has nearly filled the cask, the float 28, with its rod 27, will be raised, thereby raising also the connected ends of the levers 25 and 26, which causes disengagement of the trigger 19 with the lever 25 and simultaneous release of the valve-lever 12, so that the valve instantly closes by action of the spring 15.

A gage-bar 35, Figs. 1 and 7, stands vertically on the upper side of the gooseneck A′ and is graduated to indicate gallons. A pointer or index 36 is attached to the float-rod 27, and the latter is held by a screw-clamp 37 on the end of the lever 26, so that it may be adjusted higher or lower. By this arrangement the pointer 36 may be set to trip the trigger 19 at any angle that may be desired. In other words, this portion of the apparatus enables the vacant space to be left in a barrel to be determined in advance.

What I claim is—

1. In a filling apparatus, the combination with tube, gooseneck, valve-float, float-rod, pivoted trigger, and valve-lever, of the compound float-lever formed of two parts, which are pivoted together and also pivoted separately at fixed points, one part being connected with the float-rod and the other having a shoulder that engages the trigger, as shown and described.

2. In a filling apparatus, the combination, with the discharge-tube, of a valve arranged in a chamber of the same, a transverse axis for said valve, a coiled spring attached to one end of said axis, a screw-rod and nut for adjusting the tension of the spring, the valve-lever and short slotted sector mounted on the valve alongside the lever, the one being fast and the other loose thereon, a clamp-screw which connects the lever and sector, and trip and float mechanism, arranged substantially as specified.

3. In a filling apparatus, the combination, with the tube, the valve, valve-lever, trigger, float-rod, and trip-lever, of a fixed graduated gage-bar, a pointer for the latter, and a clamp for holding it secured in any required adjustment, as shown and described.

JOSEPH E. J. GOODLETT.

Witnesses:
H. E. MAURY,
T. W. WHITE.